(12) United States Patent
Pedemonte et al.

(10) Patent No.: US 8,038,736 B2
(45) Date of Patent: Oct. 18, 2011

(54) MIXTURES OF FIBER-REACTIVE AZO DYES

(75) Inventors: Ronald Pedemonte, Wesley Chapel, NC (US); Antonio Torrentera, Charlotte, NC (US); Tiffany Chambers, Lincolnton, NC (US)

(73) Assignee: DyStar L.P., Charlotte, NC (US)

( * ) Notice: Subject to any disclaimer, the term of this patent is extended or adjusted under 35 U.S.C. 154(b) by 3 days.

(21) Appl. No.: 12/716,783

(22) Filed: Mar. 3, 2010

(65) Prior Publication Data

US 2011/0214238 A1    Sep. 8, 2011

(51) Int. Cl.
*C09D 11/02* (2006.01)
*C09B 19/00* (2006.01)
*C09B 5/24* (2006.01)

(52) U.S. Cl. ............ 8/658; 8/638; 8/643; 8/657; 8/675; 8/676; 8/680; 8/916; 8/917; 8/918; 8/924; 8/926

(58) Field of Classification Search .............. 8/638, 643, 8/657, 658, 675, 676, 680, 916, 917, 918, 8/924, 926; 106/31.13, 31.27
See application file for complete search history.

(56) References Cited

U.S. PATENT DOCUMENTS

| | | | |
|---|---|---|---|
| 5,330,541 A | 7/1994 | Hall et al. | |
| 5,356,441 A * | 10/1994 | Tokieda et al. | 8/543 |
| 5,373,094 A | 12/1994 | Taylor et al. | |
| 5,420,256 A | 5/1995 | Eizenhofer et al. | |
| 5,489,313 A | 2/1996 | Hall et al. | |
| 5,545,236 A * | 8/1996 | Hihara et al. | 8/549 |
| 5,756,690 A | 5/1998 | Hihara et al. | |
| 5,772,698 A | 6/1998 | Reichert et al. | |
| 2008/0025786 A1 | 1/2008 | Adamson | |

FOREIGN PATENT DOCUMENTS

| | | |
|---|---|---|
| EP | 0 501 252 A1 | 9/1992 |
| EP | 0 576 143 A2 | 12/1993 |
| EP | 0 588 257 A1 | 3/1994 |
| EP | 0 603 823 A2 | 6/1994 |
| EP | 0603823 * | 6/1994 |
| EP | 0 637 615 A2 | 2/1995 |
| EP | 0 739 950 | 10/1996 |
| JP | 0 5032912 A | 2/1993 |

* cited by examiner

*Primary Examiner* — Amina Khan
(74) *Attorney, Agent, or Firm* — Conolly Bove Lodge & Hutz LLP

(57) ABSTRACT

The present invention provides dye mixtures containing a dye of the formula (I)

and a dye of the formulae (II)

where
Z is —CH=CH$_2$ or —CH$_2$CH$_2$Z$^1$ and
Z$^1$ is hydroxyl or an alkali-eliminable group; and
M is hydrogen, an alkali metal or one equivalent of an alkaline earth metal. The invention also relates to a process for their preparation and their use.

15 Claims, No Drawings

MIXTURES OF FIBER-REACTIVE AZO DYES

BACKGROUND OF THE INVENTION

This invention relates to the technical field of fiber-reactive azo dyes.

Fiber-reactive azo dye mixtures and their use for dyeing hydroxyl- and carboxamido-containing materials in greenish to reddish brilliant blue hues are known for example from Anthraquinone and Dioxazine dyes. However, they have certain performance defects, for example an insufficient color buildup at high dye concentrations, which ultimately compromises the economics of the dyeing operation. Anthraquinone dyes, such as Reactive Blue 19, do not exhibit good build-up properties and are limited to specific dyeing applications, i.e. exhaust dyeing. In contrast, Dioxazine dyes exhibit good build-up properties, but are highly dependent on specific dyeing conditions, i.e. salt and alkali amounts in exhaustion dyeing.

Consequently, there continues to be a demand for novel reactive dyes or reactive dye mixtures having improved properties, such as steep color buildup coupled with good fastnesses without special dyeing conditions. They shall moreover also provide good dyeing yields and have high reactivity and they shall more particularly provide dyeings having high degrees of fixation.

SUMMARY OF THE INVENTION

The present invention provides dye mixtures which have these above-described properties to a high degree. The novel dye mixtures are notable in particular for high yields of fixation and ready washoff for portions not fixed on the fiber. In addition, the dyeings exhibit good general fastnesses, for example high lightfastness and very good wetfastnesses.

The present invention accordingly provides a dye mixture comprising a dye of the formula (I)

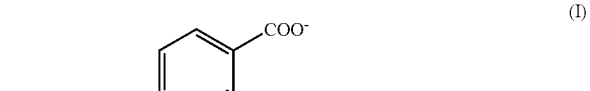

(I)

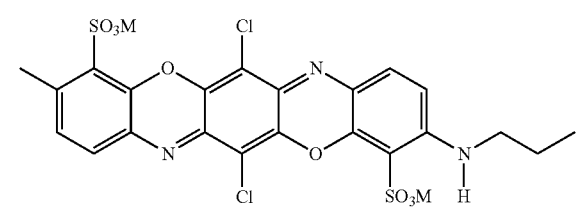

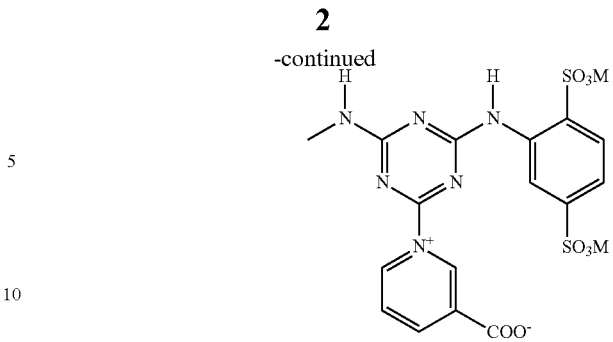

and a dye of the formulae (II)

(II)

where $Z$ is $-CH=CH_2$ or $-CH_2CH_2Z^1$ and $Z^1$ is hydroxyl or an alkali-eliminable group; and M is hydrogen, an alkali metal or one equivalent of an alkaline earth metal.

A DETAILED DESCRIPTION OF THE INVENTION

Alkali M is in particular lithium, sodium or potassium; an alkaline earth metal equivalent M is in particular the equivalent of calcium. M is preferably hydrogen or sodium.

Alkali-eliminable $Z^1$ is for example halogen atoms, such as chlorine and bromine, ester groups of organic carboxylic and sulfonic acids, for example alkylcarboxylic acids, substituted or unsubstituted benzenecarboxylic acids and substituted or unsubstituted benzenesulfonic acids, in particular alkanoyloxy of 2 to 5 carbon atoms such as acetyloxy, and also benzoyloxy, sulfobenzoyloxy, phenylsulfonyloxy and toluoylsulfonyloxy, also acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms each, such as dimethylamino and diethylamino.

$Z^1$ is preferably vinyl, β-chloroethyl and more preferably β-sulfatoethyl.

The groups "sulfo", "carboxyl", "thiosulfato", "phosphato" and "sulfato" include not only their acid form but also their salt form. Accordingly, sulfo groups are groups of the general formula $-SO_3M$, thiosulfato groups are groups of the general formula $-S-SO_3M$, carboxyl groups are groups of the general formula $-COOM$, phosphato groups are groups of the general formula $-OPO_3M_2$ and sulfato groups are groups of the general formula $-OSO_3M$, in each of which M is as defined above.

Preferred dyes of the formula (II) have the formula (IIa) or (IIb)

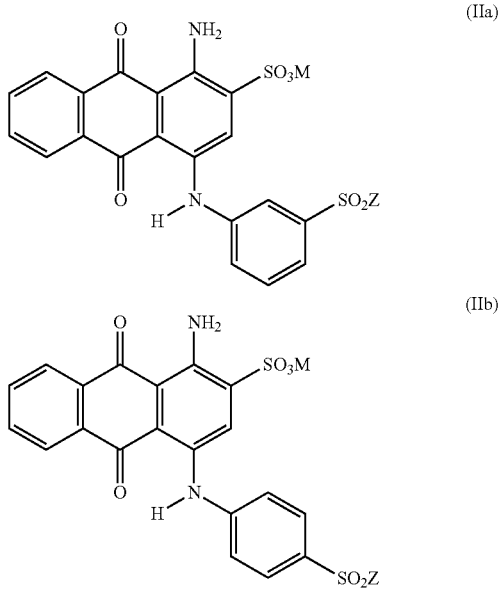

(IIa)

(IIb)

wherein M and Z are defined as given above.

The dye mixtures of the present invention contain the dye or dyes of the formula (I) in an amount of 1% to 99% by weight, preferably 30% to 70% by weight, and the dye or dyes of the formula (II) in an amount of 1% to 99% by weight, preferably 30% to 70% by weight, all based on total dye.

Other weight ratios of formulae (I) and (II) are 10:90, 20:80, 25:75, 40:60, 50:50, 60:40, 75:25, 80:20 and 90:10.

The dyes according to the invention can be present as a preparation in solid or liquid (dissolved) form. In solid form, they contain, in general, the electrolyte salts customary in the case of water-soluble and especially fiber-reactive dyes, such as sodium chloride, potassium chloride and sodium sulfate, and may further contain the auxiliaries customary in commercial dyes, such as buffer substances capable of setting a pH in aqueous solution between 3 and 7, for example sodium acetate, sodium borate, sodium bicarbonate, sodium dihydrogenphosphate, sodium tricitrate and disodium hydrogenphosphate, and small amounts of siccatives or when they are present in a liquid, aqueous solution (including a content of thickeners of the type customary in print pastes), they may also contain substances which ensure a long life for these preparations, for example mold preventatives.

In solid form, the dye mixtures according to the invention are generally present as powders or granules which contain electrolyte salt and which will hereinbelow generally be referred to as a preparation with or without one or more of the abovementioned auxiliaries. In the preparations, the dye mixture is present at 20 to 90% by weight, based on the preparation containing it. The buffer substances are generally present in a total amount of up to 5% by weight, based on the preparation.

When the dye mixtures according to the invention are present in an aqueous solution, the total dye content of these solutions is up to about 50% by weight, for example between 5 and 50% by weight, the electrolyte salt content preferably being below 10% by weight, based on the aqueous solution. The aqueous solutions (liquid preparations) can also contain buffer substances in an amount which is generally up to 5% by weight and preferably from 0.1 to 2% by weight.

The dye mixtures according to the invention are preparable in a conventional manner, for example by mechanically mixing the individual dyes, whether in the form of their dye powders or granules or in the form of aqueous solutions, for example their as-synthesized solutions, which may additionally contain customary auxiliaries.

The dye mixtures of the present invention have useful application properties and can be used for dyeing and printing carboxamido- and/or hydroxyl-containing materials. The materials mentioned can be for example in the form of sheetlike structures such as paper and leather, in the form of films, for example polyamide films or in the form of a bulk composition, for example polyamide or polyurethane. But particularly they are present in the form of fibers of the materials mentioned. The dye mixtures of the present invention are used for dyeing and printing cellulosic fibrous materials of any kind. They are preferably also useful for dyeing or printing polyamide fibers or blend fabrics composed of polyamide with cotton or with polyester fibers. It is also possible to use the dye mixtures of the present invention to print textiles, paper or other materials by the inkjet process.

The present invention thus also provides for the use of the dye mixtures of the present invention for dyeing printing these materials, or rather processes for dyeing or printing such materials in a conventional manner, by using a dye mixture of the present invention as a colorant. The dye mixtures of the present invention provide orange to red dyeings having very good fastness properties on these materials, preferably fiber materials.

Advantageously, the as-synthesized solutions of the dye mixtures of the present invention can be used directly as a liquid preparation for dyeing, if appropriate after addition of a buffer substance and if appropriate after concentration or dilution.

Fiber materials and fibers herein are in particular textile fibers which can be present as woven fabrics, yarns or in the form of hanks or wound packages.

Carboxamido-containing materials are for example synthetic and natural polyamides and polyurethanes, in particular in the form of fibers, for example wool and other animal hairs, silk, leather, nylon-6,6, nylon-6, nylon-11 and nylon-4.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers. Regenerated cellulose fibers are for example staple viscose and filament viscose.

The dye mixtures of the present invention can be applied to and fixed on the materials mentioned, in particular on the fiber materials mentioned, by the application techniques known for water-soluble dyes and particularly for fiber-reactive dyes.

On cellulose fibers, they produce by the exhaust method from a short liquor as well from a long liquor, by using various acid-binding agents and if appropriate neutral salts, such as sodium chloride or sodium sulfate, dyeings having very good color yields. Dyeing is preferably effected by the exhaust method at a pH of 3 to 7 and in particular at a pH of 4 to 6. The liquor ratio can be selected within a wide range and is for example between 3:1 and 100:1 and preferably between 5:1 and 30:1. Applications are preferably from an aqueous bath at temperatures between 40 and 105° C., if appropriate at a temperature of up to 130° C. under superatmospheric pressure, and if appropriate in the presence of customary dyeing auxiliaries. To enhance the wetfastnesses of the dyed material, unfixed dye can be removed in an aftertreatment. This aftertreatment is effected in particular at a pH of 8 to 9 and temperatures of 75 to 80° C.

One possible procedure here is to introduce the material into the warm bath and to gradually heat the bath to the desired temperature and complete the dyeing operation. The neutral salts which accelerate the exhaustion of the dyes can also if desired only be added to the bath after the actual dyeing temperature has been reached.

Padding processes likewise provide excellent color yields and a very good color buildup on cellulose fibers, the dyes being fixable in a conventional manner by batching at room temperature or elevated temperature, for example at up to about 60° C., or by steaming or by means of dry heat.

Similarly, the customary printing processes for cellulose fibers, which can be carried out in one step, for example by printing with a print paste containing sodium bicarbonate or some other acid-binding agent and by subsequent steaming at 100 to 103° C., or in two steps, for example by printing with a neutral to weak acidic print color and then fixing either by passing the printed material through a hot electrolyte-containing alkaline bath or by overpadding with an alkaline electrolyte-containing padding liquor and subsequent batching or steaming or dry heat treatment of the alkali-overpadded material, produce strong color prints with well-defined contours and a clear white ground. The outcome of the prints is affected little, if at all, by variations in the fixing conditions.

When fixing by means of dry heat in accordance with the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dyes on the cellulose fibers are for example water-soluble basic salts of alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dye mixtures of the present invention are notable for outstanding color strength and a steep course of the buildup curve on cellulose fiber materials when applied in the familiar dyeing and printing processes. The dyeings and prints obtainable with the dye mixtures of the present invention on cellulose fiber materials further have good lightfastness and, in particular, good wetfastnesses, such as fastness to washing, milling, water, seawater, crossdyeing and acidic and alkaline perspiration, also good fastness to pleating, hotpressing and rubbing.

The dyeings and prints obtained following the customary aftertreatment of rinsing to remove unfixed dye portions further exhibit excellent wetfastnesses, in particular since unfixed dye portions are easily washed off because of their good solubility in cold water.

Furthermore, the dye mixtures according to the invention can also be used for the fiber-reactive dyeing of wool. Moreover, wool which has been given a nonfelting or low-felting finish (cf. for example H. Rath, Lehrbuch der Textilchemie, Springer-Verlag, 3rd edition (1972), pages 295-299, especially finished by the Hercosett process (page 298); J. Soc. Dyers and Colourists 1972, 93-99, and 1975, 33-44), can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalene-sulfonic acid or on the basis of a reaction product of for example stearylamine with ethylene oxide. For instance, the dye mixture according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures according to the invention and the fiber. At the same time, the dye portion not reactively bound is removed.

The procedure described herein also applies to the production of dyeings on fiber materials composed of other natural polyamides or of synthetic polyamides and polyurethanes. These materials can be dyed using the customary dyeing and printing processes described in the literature and known to one skilled in the art (see for example H.-K. Rouette, Handbuch der Textilveredlung, Deutscher Fachverlag GmbH, Frankfurt/Main). In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures according to the invention is very good, they can also be used with advantage in customary continuous dyeing processes. The color strength of the dye mixtures according to the invention is very high.

The present invention also provides inks for digital textile printing by the inkjet process, containing a dye mixture of the present invention.

The inks of the present invention contain a dye mixture of the present invention for example in amounts of 0.1% to 50% by weight, preferably in amounts of 1% to 30% by weight and more preferably in amounts of 1% to 15% by weight, based on the total weight of the ink. It will be appreciated that the inks can also contain mixtures of dye mixtures of the present invention and other dyes used in textile printing. For the inks to be used in the continuous flow process, a conductivity of 0.5 to 25 mS/m can be set by adding an electrolyte. Useful electrolytes include for example lithium nitrate and potassium nitrate.

The inks of the present invention can contain organic solvents in a total amount of 1-50% and preferably 5-30% by weight.

Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, triethylamine, diethylamine, dimethylamine, trimethylamine, dibutylamine, diethanolamine, triethanolamine, N-formylethanolamine, ethylenediamine, urea derivatives, such as for example: urea, thiourea, N-methylurea, N,N'-epsilon-dimethylurea, ethyleneurea, 1,1,3,3-tetramethylurea, N-acetylethanolamine, amides, such as for example: dimethylformamide, dimethylacetamide, acetamide, ketones or keto alcohols, such as for example: acetone, diacetone alcohol, cyclic ethers, such as for example; tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexyl-pyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy) ethanol, 2-(2-ethoxyethoxy)ethanol, 2-(2-butoxyethoxy) ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether, 1,2-dimethoxypropane and trimethylpropane.

The inks of the present invention may further contain customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas. Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, non-ionic cellulose ethers.

As further additives the inks of the invention may include surface-active substances to set surface tensions of 20 to 65 mN/m, which are adapted if necessary as a function of the process used (thermal or piezotechnology).

Useful surface-active substances include for example: all surfactants, preferably nonionic surfactants, butyldiglycol, 1,2-hexanediol.

The inks may further include customary additives, for example substances to inhibit fungal and bacterial growth in amounts from 0.01 to 1% by weight based on the total weight of the ink.

The inks of the invention may be prepared in a conventional manner by mixing the components in water.

The inks of the invention are useful in inkjet printing processes for printing a wide variety of pretreated materials, such as silk, leather, wool, cellulosic fiber materials of any kind and polyurethanes, and especially polyamide fibers. The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step. The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried. After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate.

In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print aftertreatment, which is the prerequisite for good fastnesses, high brilliance and an impeccable white ground.

The prints produced using the inks of the present invention have, in particular on polyamide, a high color strength and a high fiber-dye bond stability not only in the acidic region but also in the alkali region, also good lighffastness and very good wetfastness properties, such as fastness to washing, water, seawater, crossdyeing and perspiration, and also good fastness to pleating, hotpressing and rubbing.

The examples hereinbelow serve to illustrate the invention. Parts and percentages are by weight, unless otherwise stated. Parts by weight relate to parts by volume as the kilogram relative to the liter. The compounds described in the examples in terms of a formula are indicated in the form of the sodium salts, since they are generally prepared and isolated in the form of their salts, preferably sodium or potassium salts, and used for dyeing in the form of their salts. The starting compounds described in the examples hereinbelow, especially the table examples, can be used in the synthesis in the form of the free acid or likewise in the form of their salts, preferably alkali metal salts, such as sodium or potassium salts.

Example 1

In an exhaust dyeing machine was set 10 g of a knit cotton fabric. The liquor ratio and water temperature were adjusted to 1:10 and 60° C., respectively.

Then, 0.25 g of a dye represented by formula (1) in the sodium salt form:

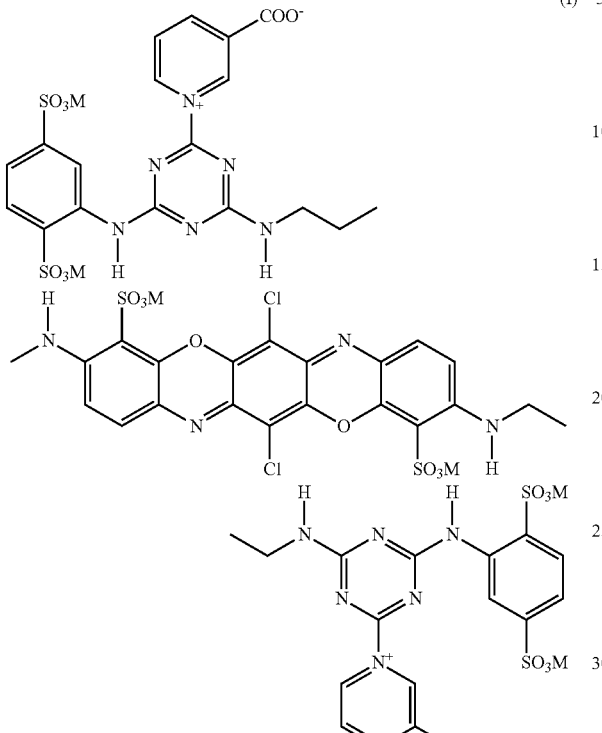

(1)

which had been dissolved previously, 0.75 g of a dye represented by formula (2) in the sodium salt form:

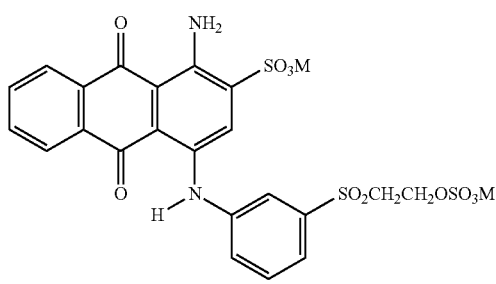

(2)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing.

The dyed fabric had a level strong brilliant blue appearance.

Alternatively, the dye mixture of Example 1 can be premixed in powder or liquid form in the same ratios and then added to the bath. After the dyeing is carried out in the manner described in Example 1, the dyed fabric fabric had uniform, level strong brilliant blue appearance.

Example 2

In an exhaust dyeing machine was set 10 g of a knit cotton fabric. The liquor ratio and water temperature were adjusted to 1:10 and 60° C., respectively.

Then, 0.75 g of a dye represented by formula (1) in the sodium salt form:

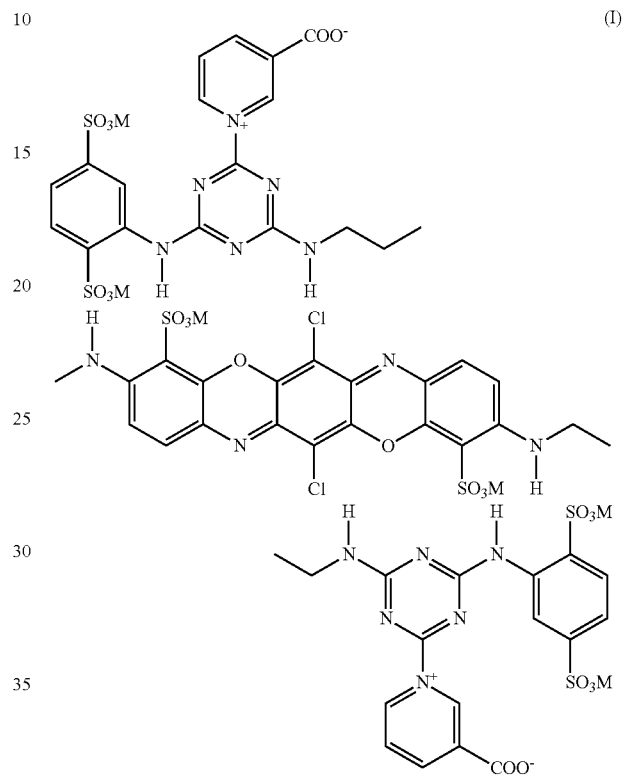

(1)

which had been dissolved previously, 0.25 g of a dye represented by formula (2) in the sodium salt form:

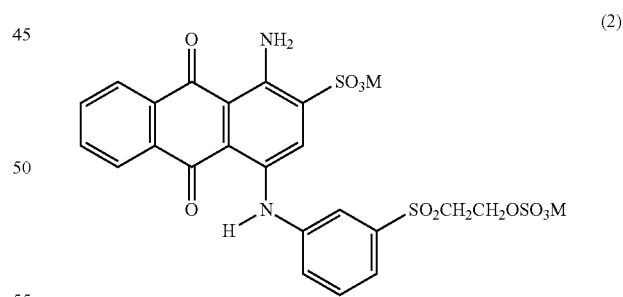

(2)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 2 can be premixed in powder or liquid form in the same ratios and then added to the bath. After the dyeing is carried out in the manner described in Example 2, the dyed fabric fabric had uniform, level strong brilliant blue appearance.

Example 3

In an exhaust dyeing machine was set 10 g of a knit cotton fabric. The liquor ratio and water temperature were adjusted to 1:10 and 60° C., respectively.

Then, 0.50 g of a dye represented by formula (1) in the sodium salt form:

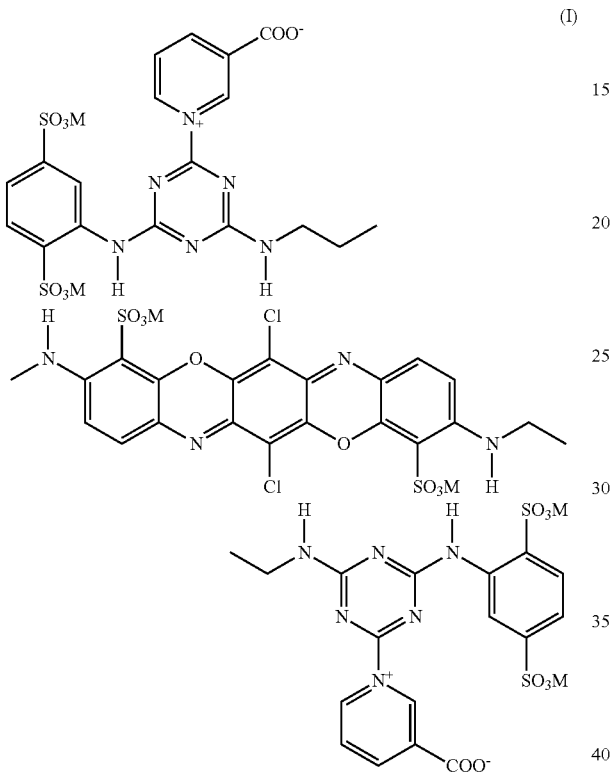

(1)

which had been dissolved previously, 0.50 g of a dye represented by formula (2) in the sodium salt form:

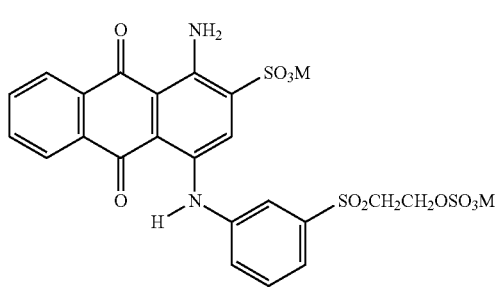

(2)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 3 can be premixed in powder or liquid form in the same ratios and then added to the bath. After the dyeing is carried out in the manner described in Example 3, the dyed fabric fabric had uniform, level strong brilliant blue appearance.

Example 4

In an exhaust dyeing machine was set 10 g of a knit cotton fabric. The liquor ratio and water temperature were adjusted to 1:10 and 60° C., respectively.

Then, 0.35 g of a dye represented by formula (1) in the sodium salt form:

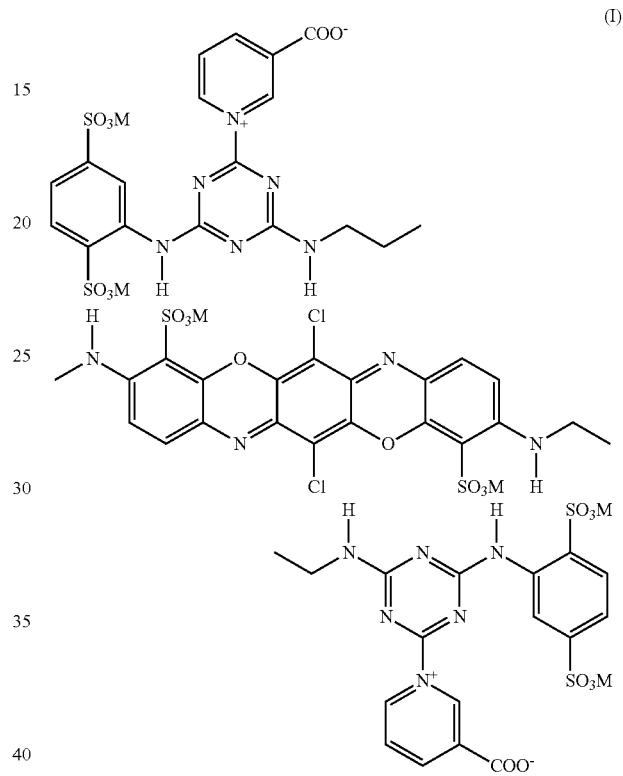

(1)

which had been dissolved previously, 0.65 g of a dye represented by formula (2) in the sodium salt form:

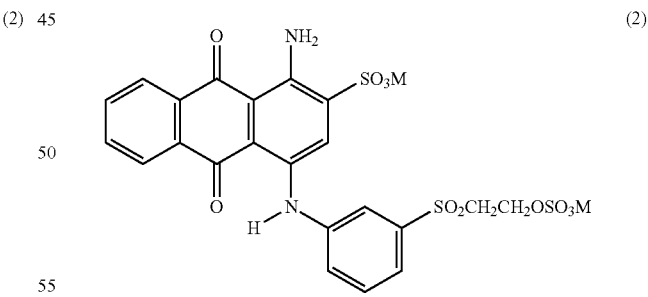

(2)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 4 can be premixed in powder or liquid form in the same ratios and then added to the bath. After the dyeing is carried out in the manner described in Example 4, the dyed fabric fabric had uniform, level strong brilliant blue appearance.

Example 5

In an exhaust dyeing machine was set 10 g of a knit cotton fabric. The liquor ratio and water temperature were adjusted to 1:10 and 60° C., respectively.

Then, 0.65 g of a dye represented by formula (1) in the sodium salt form:

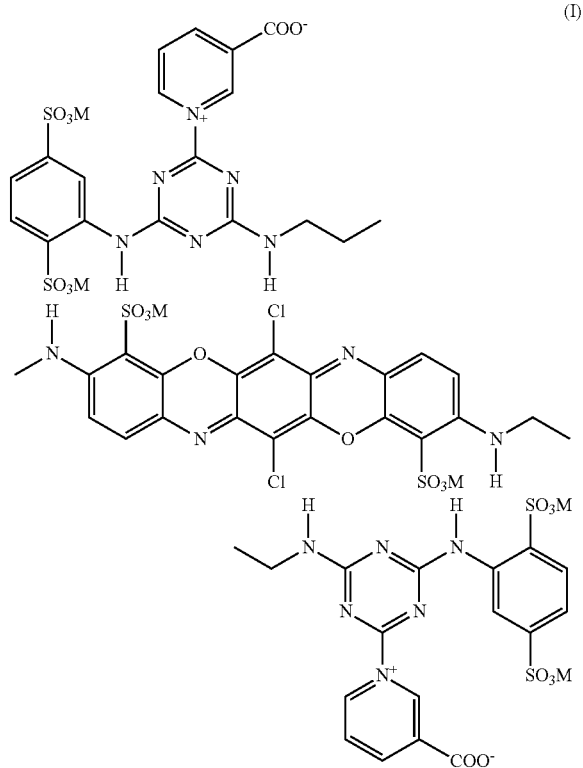

(I)

which had been dissolved previously, 0.35 g of a dye represented by formula (2) in the sodium salt form:

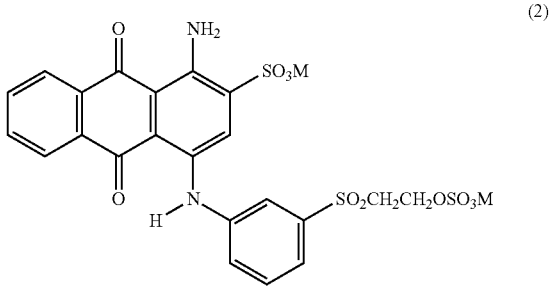

(2)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 5 can be pre-mixed in powder or liquid form in the same ratios and then added to the bath. After the dyeing is carried out in the manner described in Example 5, the dyed fabric fabric had uniform, level strong brilliant blue appearance.

Example 6

In an exhaust dyeing machine was set 10 g of a knit cotton fabric. The liquor ratio and water temperature were adjusted to 1:10 and 60° C., respectively.

Then, 0.35 g of a dye represented by formula (1) in the sodium salt form:

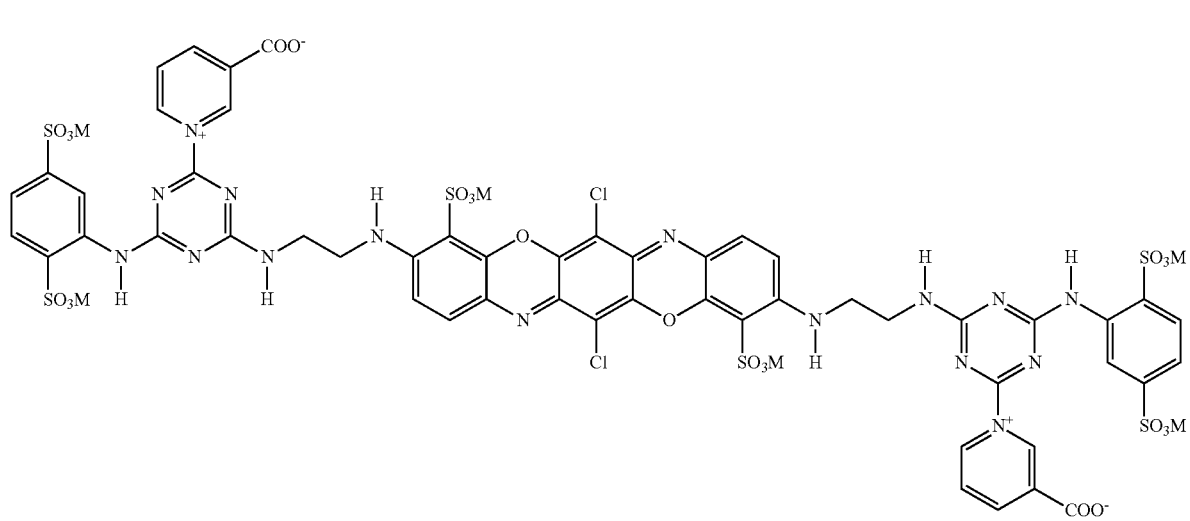

(1)

which had been dissolved previously, 0.65 g of a dye represented by formula (3) in the sodium salt form:

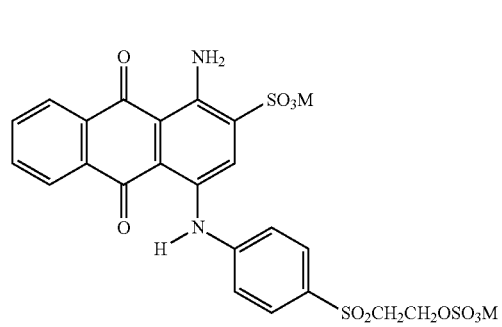

(3)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 6 can be premixed in powder or liquid form in the same ratios and then added to the bath. After the dyeing is carried out in the manner described in Example 6, the dyed fabric fabric had uniform, level strong brilliant blue appearance.

Example 7

In an exhaust dyeing machine was set 10 g of a knit cotton fabric. The liquor ratio and water temperature were adjusted to 1:10 and 60° C., respectively.

Then, 0.65 g of a dye represented by formula (1) in the sodium salt form:

which had been dissolved previously, 0.35 g of a dye represented by formula (3) in the sodium salt form:

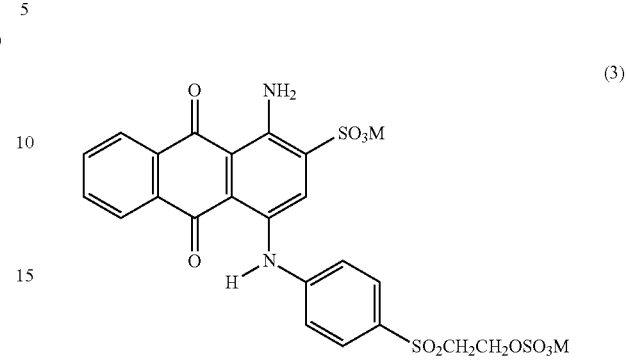

(3)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 7 can be premixed in powder or liquid form in the same ratios and then added to the bath. After the dyeing is carried out in the manner described in Example 7, the dyed fabric fabric had uniform, level strong brilliant blue appearance.

Example 8

In an exhaust dyeing machine was set 10 g of a knit cotton fabric. The liquor ratio and water temperature were adjusted to 1:10 and 60° C., respectively.

(1)

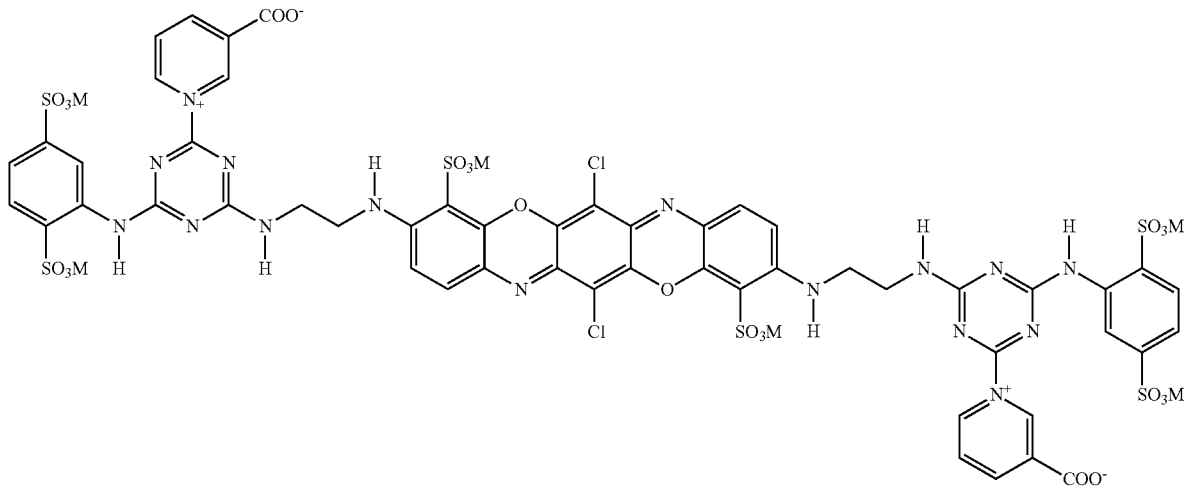

Then, 0.35 g of a dye represented by formula (1) in the sodium salt form:

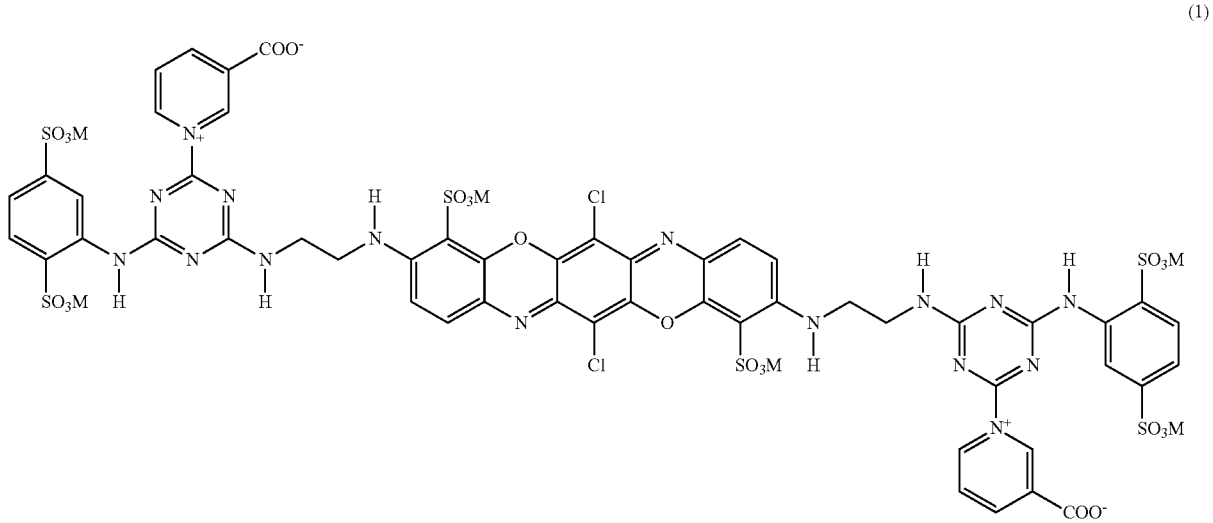

(1)

which had been dissolved previously, 0.50 g of a dye represented by formula (2) in the sodium salt form:

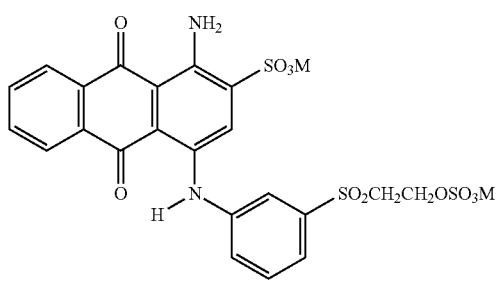

(2)

which had been dissolved previously, 0.15 g of a dye represented by formula (3) in the sodium salt form:

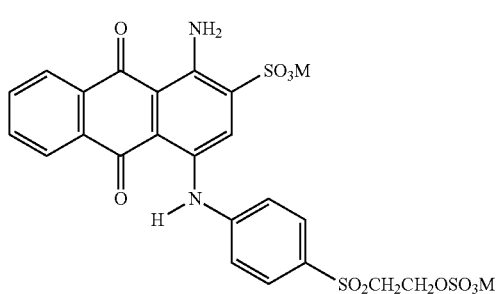

(3)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 8 can be premixed in powder or liquid form in the same ratios and then added to the bath. After the dyeing is carried out in the manner described in Example 8, the dyed fabric fabric had uniform, level strong brilliant blue appearance.

Example 9

In an exhaust dyeing machine was set 10 g of a knit cotton fabric. The liquor ratio and water temperature were adjusted to 1:10 and 60° C., respectively.

Then, 0.65 g of a dye represented by formula (1) in the sodium salt form:

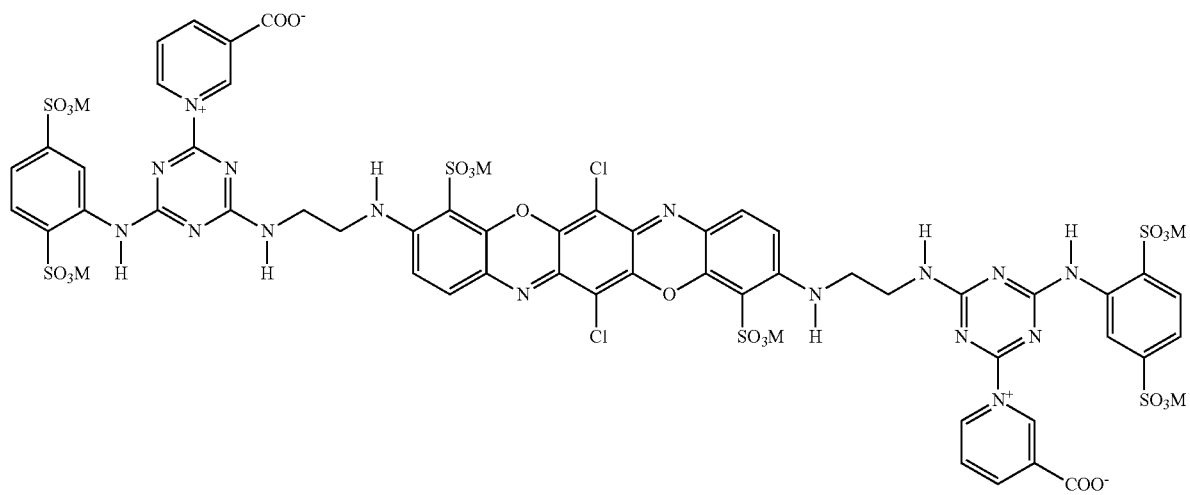

(1)

which had been dissolved previously, 0.25 g of a dye represented by formula (2) in the sodium salt form:

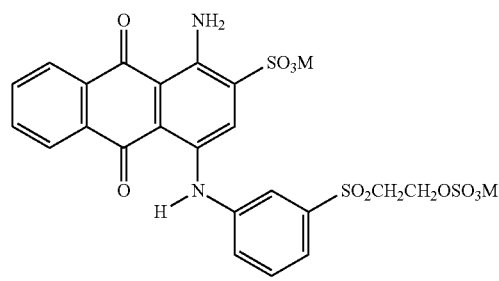

(2)

which had been dissolved previously, 0.10 g of a dye represented by formula (3) in the sodium salt form:

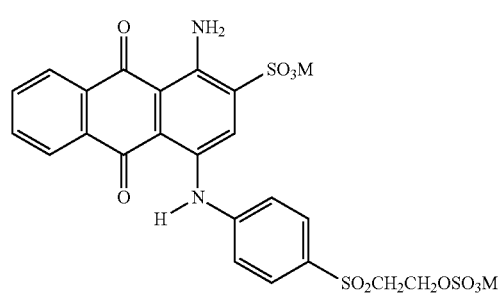

(3)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 9 can be premixed in powder or liquid form in the same ratios and then added to the bath. After the dyeing is carried out in the manner described in Example 9, the dyed fabric fabric had uniform, level strong brilliant blue appearance.

Example 10

In an exhaust dyeing machine was set 10 g of a knit cotton fabric. The liquor ratio and water temperature were adjusted to 1:10 and 60° C., respectively.

Then, 0.35 g of a dye represented by formula (1) in the sodium salt form:

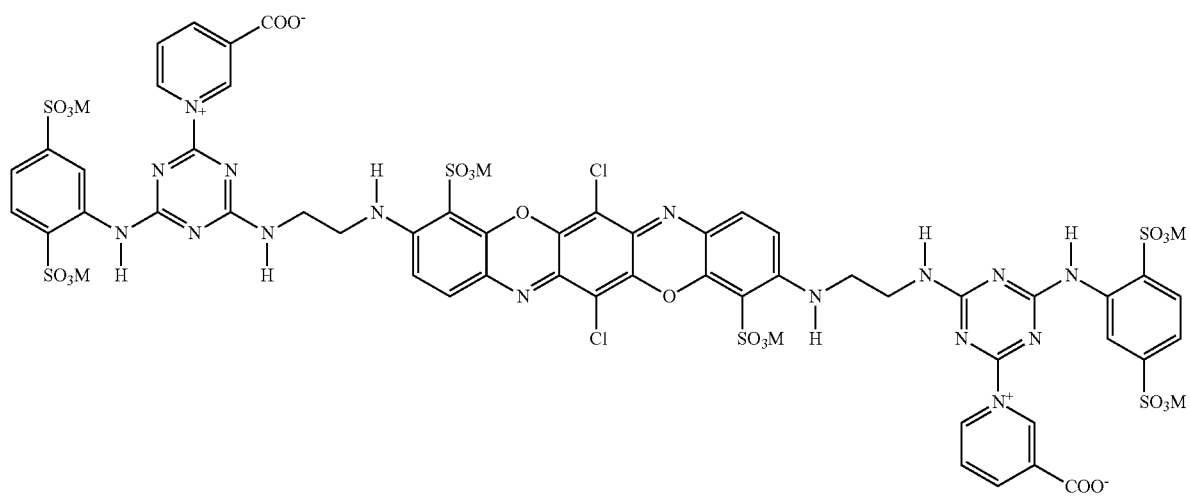

(1)

which had been dissolved previously, 0.15 g of a dye represented by formula (2) in the sodium salt form:

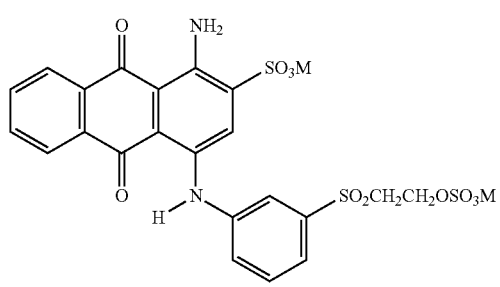

(2)

which had been dissolved previously, 0.50 g of a dye represented by formula (3) in the sodium salt form:

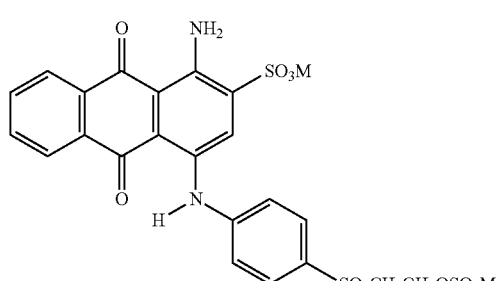

(3)

were put into the bath in the conventional manner. Further, 0.60 g of sodium sulfate salt was added into the bath with the dyes. After treating the knit fabric at this temperature for 30 minutes, 0.5 g, in the total, of sodium carbonate was added to the bath followed by 0.1 g of 50% sodium hydroxide in the conventional method. Then, the knit fabric was treated at this temperature for 60 minutes to complete the dyeing. The dyed fabric had a level strong brilliant blue appearance.

Alternatively, the dye mixture of Example 10 can be pre-mixed in powder or liquid form in the same ratios and then added to the bath. After the dyeing is carried out in the manner described in Example 10, the dyed fabric fabric had uniform, level strong brilliant blue appearance.

Example 11

A textile fabric consisting of mercerized cotton is padded with a liquor containing 35 g/l of anhydrous sodium carbonate, 100 g/l of urea and 150 g/l of a low viscosity sodium alginate solution (6%) and then dried. The wet pickup is 70%.

The thus pretreated textile is printed with an aqueous ink containing
2% of a dye mixture as per example 1
20% of sulfolane
0.01% of Mergal K9N
77.99% of water
using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is a bluish red print having excellent service fastnesses.

Comparison Example 1

A dye mixture of Example 4 was dyed by methods described in the above examples at various concentrations. Similarly, dyes of Formula 1 and Formula 2 were dyed individually under the same conditions and concentrations. The results are shown in the table below. Unexpectedly, Example 4, which is a mixture of Formulae 1 and 2, dyes deeper per the Integ. values than the individual dyes dyed independently.

| Dye Formula 1 | | Dye Formula 2 | | Dye Mixture of Example 4 | |
|---|---|---|---|---|---|
| Conc | Integ. Value | Conc | Integ. Value | Conc | Integ. Value |
| 0.00 | 0.000 | 0.00 | 0.000 | 0.00 | 0.000 |
| 0.50 | 5.00 | 0.50 | 3.73 | 0.50 | 4.250 |
| 0.75 | 6.80 | 0.75 | 5.61 | 0.75 | 6.200 |
| 1.00 | 8.70 | 1.00 | 7.49 | 1.00 | 8.520 |
| 2.00 | 17.43 | 2.00 | 14.43 | 2.00 | 15.710 |
| 3.00 | 23.00 | 3.00 | 21.71 | 3.00 | 23.770 |
| 4.00 | 26.700 | 4.00 | 26.700 | 4.00 | 29.500 |

-continued

| Dye Formula 1 | | Dye Formula 2 | | Dye Mixture of Example 4 | |
|---|---|---|---|---|---|
| Conc | Integ. Value | Conc | Integ. Value | Conc | Integ. Value |
| 5.00 | 30.500 | 5.00 | 32.200 | 5.07 | 35.300 |
| 6.00 | 32.460 | 6.00 | 37.800 | 6.00 | 39.000 |
| 7.00 | 34.000 | 7.00 | 41.100 | 7.00 | 42.410 |
| 8.00 | 35.700 | 8.00 | 43.280 | 8.00 | 44.500 |
| 9.00 | 37.930 | 9.00 | 44.440 | 9.00 | 45.390 |
| 10.00 | 35.760 | 10.00 | 42.200 | 10.00 | 43.840 |

We claim:

1. Dye mixture consisting of a dye of the formula (I)

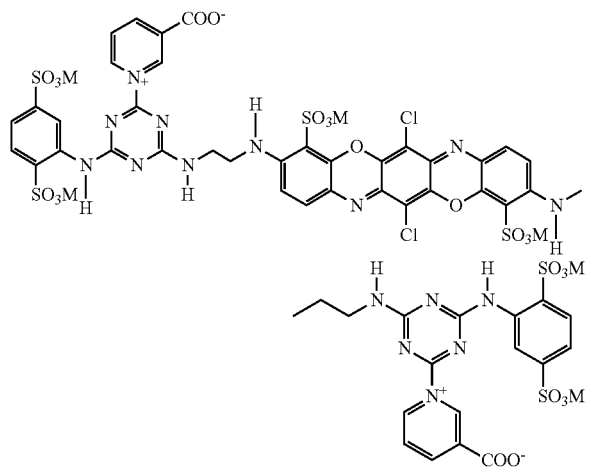

(I)

and a dye of the formulae (II)

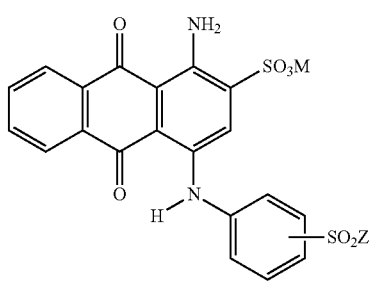

(II)

where
Z is —CH=CH$_2$ or —CH$_2$CH$_2$Z$^1$ and
Z$^1$ is hydroxyl or an alkali-eliminable group; and
M is hydrogen, an alkali metal or an alkaline earth metal.

2. The dye mixture as claimed in claim 1, wherein the dye or dyes of the formula (I) are present in an amount of 1% to 99% by weight and the dye or dyes of the formula (II) are present in an amount of 1% to 99% by weight all based on total dye.

3. The dye mixture as claimed in claim 1, wherin the dye or dyes of the formula (I) are present in an amount of 10% to 90% by weight and the dye or dyes of the formula (II) are present in an amount of 10% to 90% by weight, all based on total dye.

4. The dye mixture as claimed in claim 1, wherein M is hydrogen, lithium, sodium, potassium or calcium.

5. The dye mixture as claimed in claim 1, wherein M is hydrogen or sodium.

6. The dye mixture as claimed in claim 1, wherein Z is —CH=CH$_2$.

7. The dye mixture as claimed in claim 1, wherein Z is —CH$_2$CH$_2$Z$^1$.

8. The dye mixture as claimed in claim 7, wherein Z$^1$ is hydroxyl, halogen atoms, ester groups of organic carboxylic and sulfonic acids, benzoyloxy, sulfobenzoyloxy, phenylsulfonyloxy and toluoylsulfonyloxy, acidic ester groups of inorganic acids, or dialkylamino groups having alkyl groups of 1 to 4 carbon atoms each.

9. The dye mixture as claimed in claim 7, wherein Z$^1$ is hydroxyl, chlorine and bromine, alkylcarboxylic acids, substituted or unsubstituted benzenecarboxylic acids, substituted or unsubstituted benzenesulfonic acids, acetyloxy, benzoyloxy, sulfobenzoyloxy, phenylsulfonyloxy toluoylsulfonyloxy, phosphoric acid, sulfuric acid thiosulfuric acid dimethylamino or diethylamino.

10. The dye mixture as claimed in claim 7, wherein Z$^1$ is vinyl, β-chloroethyl or β-sulfatoethyl.

11. The dye mixture as claimed in claim 10, wherein M is hydrogen or sodium.

12. The dye mixture as claimed in claim 11, wherein the dye or dyes of the formula (I) are present in an amount of 30% to 70% by weight and the dye or dyes of the formula (II) are present in an amount of 30% to 70% by weight, all based on total dye.

13. A process for preparing a dye mixture as claimed in claim 1, which comprises mixing the individual dyes mechanically with each or one another.

14. A process for dyeing or printing of carboxamido- and/or hydroxyl-containing material which comprises contacting the material with the dye mixture according to claim 1.

15. An ink for digital textile printing by the inkjet process, which comprises the dye mixture as claimed in claim 1.

* * * * *